(12) United States Patent
Johns et al.

(10) Patent No.: US 7,285,251 B2
(45) Date of Patent: Oct. 23, 2007

(54) TOOL FOR LOADING REACTOR TUBES

(75) Inventors: Clifford L. Johns, Louisville, KY (US); Daniel D. Sympson, Louisville, KY (US)

(73) Assignee: TubeMaster Inc., Louisville, KY (US)

( * ) Notice: Subject to any disclaimer, the term of this patent is extended or adjusted under 35 U.S.C. 154(b) by 459 days.

(21) Appl. No.: 10/401,663

(22) Filed: Mar. 28, 2003

(65) Prior Publication Data

US 2004/0191135 A1  Sep. 30, 2004

(51) Int. Cl.
*B01J 8/08* (2006.01)

(52) U.S. Cl. ............ 422/219; 422/232; 141/286; 141/331; 33/483; 33/542; 33/679.1; 33/722; 33/863

(58) Field of Classification Search ......... 422/219, 422/145, 232; 208/152; 141/234, 237, 286, 141/285, 331; 33/679.1, 721–722, 483, 542, 33/832–833, 836
See application file for complete search history.

(56) References Cited

U.S. PATENT DOCUMENTS

| | | | |
|---|---|---|---|
| 241,597 A * | 5/1881 | Confer et al. .......... | 137/516.25 |
| 3,223,490 A | 12/1965 | Sacken et al. | |
| 3,788,370 A | 1/1974 | Hare et al. | |
| 3,829,983 A | 8/1974 | White | |
| 3,913,806 A | 10/1975 | Red, Jr. | |
| 3,981,324 A * | 9/1976 | Waring .................... | 137/556.6 |
| 4,081,004 A * | 3/1978 | Harris ...................... | 141/10 |
| 5,488,979 A * | 2/1996 | McKenzie ................. | 141/331 |
| 6,112,781 A * | 9/2000 | Baxter ...................... | 141/391 |
| 6,409,977 B2 | 6/2002 | Harper et al. | |

FOREIGN PATENT DOCUMENTS

| | | |
|---|---|---|
| EP | 0 963 785 | 12/1999 |
| GB | 2 186 209 | 8/1987 |
| WO | WO 2004/037403 | 10/2003 |

* cited by examiner

*Primary Examiner*—Basia Ridley
(74) *Attorney, Agent, or Firm*—Theresa Fritz Camoriano; Camoriano and Associates

(57) ABSTRACT

The present invention provides a tool that can be used to load catalyst into a chemical reactor. In a preferred embodiment, the tool may also be used to measure the outage in the reactor tube. Also in a preferred embodiment, the tool provides a way to prevent dust from accumulating on the upper tube sheet of the reactor while loading catalyst into the reactor tubes.

12 Claims, 6 Drawing Sheets

TOOL FOR LOADING REACTOR TUBES

BACKGROUND OF THE INVENTION

The present invention relates to chemical reactors, and, in particular, to a device for loading the tubes of chemical reactors with catalyst.

In the past, many different types of devices have been used to assist in loading catalyst into reactor tubes. For example, various sleeves, templates, and vibrating machines have been used. Then, once the catalyst has been loaded, a stick is inserted into each tube to measure the distance from the top of the catalyst to the top of the reactor tube (the outage) to see whether that space or outage is within the desired range. If the outage is too large, additional catalyst is loaded and the outage is measured again. If the outage is too small, catalyst is vacuumed out of the tube and the outage is measured again.

SUMMARY OF THE INVENTION

The present invention provides a loading sleeve for loading catalyst into a reactor tube. The loading sleeve has an upper flange, which rests on the upper tube sheet of the reactor, and a tube projecting downwardly from the flange into the reactor tube. Since the tube portion of the loading sleeve has a smaller diameter than the reactor tube, when the loading sleeve is filled with catalyst and is then removed from the reactor tube, it leaves a gap or outage at the top of the reactor tube.

In a preferred embodiment of the present invention, the loading sleeve also has some type of marking which can be used for checking the outage. After the loading sleeve has been removed from the reactor tube, and the catalyst has settled into the reactor tube, the loading sleeve is again inserted into the reactor tube until it rests on the catalyst in the reactor tube, with a portion of the loading sleeve projecting upwardly, out of the reactor tube. By checking the markings on the portion of the loading sleeve projecting out of the reactor tube, a person can see whether the tube has been loaded to a height that is within the desired loading specifications. This eliminates the need for a separate testing tool.

Also in a preferred embodiment of the present invention, the flanges of the loading sleeves may be made large enough that they overlap each other. This helps prevent dust from getting in between the loading sleeves.

DESCRIPTION OF THE PREFERRED EMBODIMENTS

Figure 1:
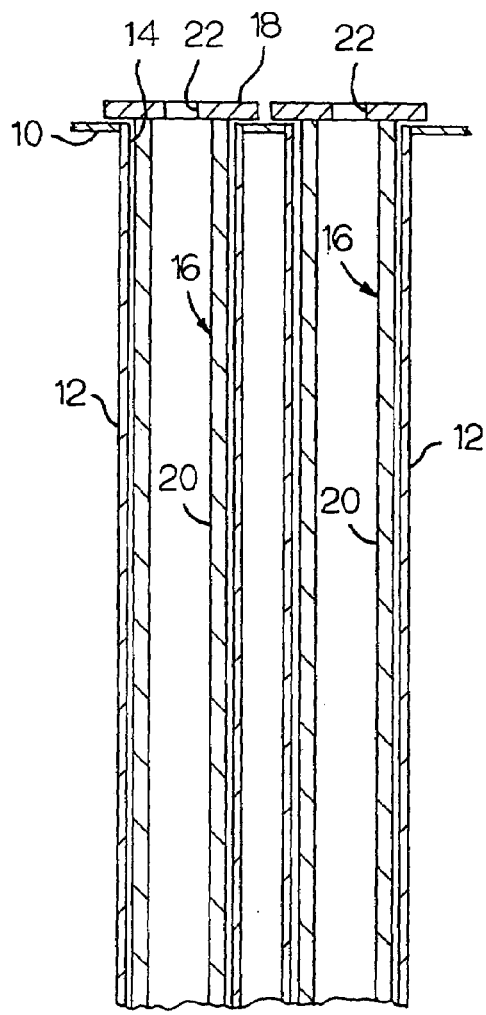
FIG. 1 is a broken-away section view through the upper portion of a chemical reactor, with loading sleeves of the present invention inserted into the reactor tubes.

FIG. 1 is a section view through a portion of a chemical reactor. The reactor includes an upper tube sheet 10 and a lower tube sheet (not shown), which is parallel to the upper tube sheet 10. A plurality of reactor tubes 12 extends downwardly from the upper tube sheet 10 to the lower tube sheet. The upper and lower tube sheets have openings 14 aligned with the tubes 12. In this view, loading sleeves 16 have been inserted into the reactor tubes 12. Each of the loading sleeves 16 includes an upper flange portion 18, which rests on the upper tube sheet 10, and a downwardly-extending tubular sleeve portion 20, which extends into its respective reactor tube 12. The flange 18 defines a central opening 22, which opens into the inside of the tubular sleeve portion 20. In this embodiment, the tubular sleeve 20 has a constant diameter, and the opening 22 has a constant diameter that is smaller than the inside diameter of the tubular sleeve 20. The size of the opening 22 depends upon the size and shape of catalyst to be used and is usually just a bit larger than the catalyst so that the catalyst enters into the loading sleeve 16 one piece at a time.

Figure 2:
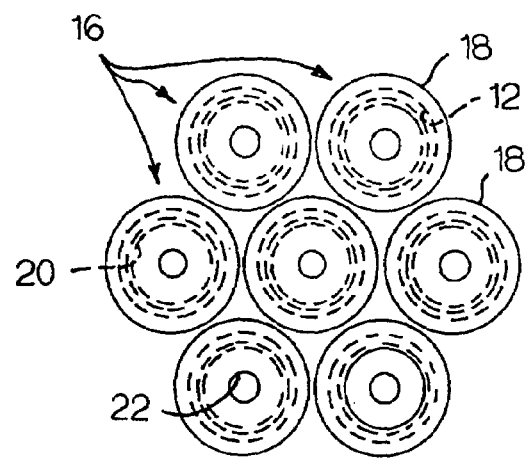
FIG. 2 is a top view of a portion of the reactor of FIG. 2.
Figure 3:
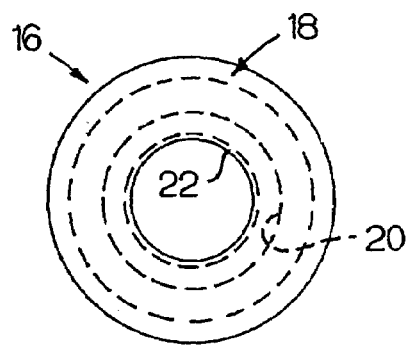
FIG. 3 is an enlarged top view of one of the reactor tubes of FIG. 1.

FIG. 2 is a top view showing a plurality of the loading sleeves 16 inserted into a plurality of adjacent reactor tubes 12. In this view, it can be seen that the tubular sleeves 20 and flanges 18 have a circular cross-sectional shape, which is preferred. However, other shapes could also be used. FIG. 3 is an enlarged top view of one of the loading sleeves 16 in its respective tube 12. The outside diameter of the downwardly-projecting tubular sleeve 20 is small enough to fit easily into the reactor tube 12, and the flange 18 is large enough to prevent the loading sleeve 16 from falling through the opening 14 into the reactor tube 12.

Figure 5:
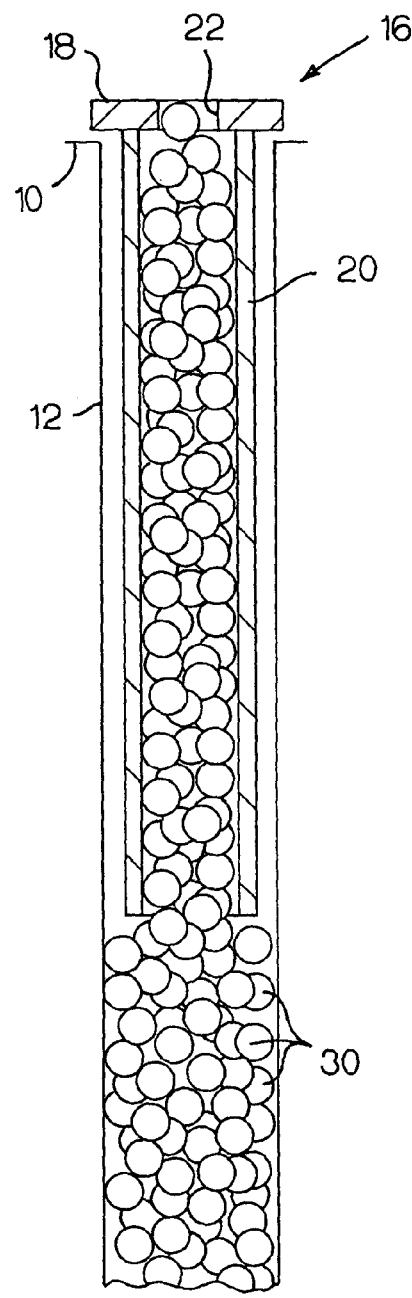
FIG. 5 is a schematic view showing catalyst being loaded into the reactor tube through the loading sleeve of FIG. 1.

FIG. 5 is a schematic view showing the loading sleeve 16 being used to load catalyst into the reactor tube 12. In this view, the catalyst 30 is shown as being spherical, but it could be of various shapes. Catalyst frequently has a cylindrical shape, for example. The loading sleeve 16 is inserted into the reactor tube 12 until the flange 18 rests on the upper tube sheet 10. Then catalyst 30 is inserted through the opening 22 in the flange 18. Typically the catalyst 30 is inserted by hand or broom massage, but other methods may also be used. The catalyst 30 falls through the loading sleeve 16 and into the reactor tube 12, filling the reactor tube 12 from the bottom up. Eventually, the catalyst 30 also fills the interior of the loading sleeve 16, as shown in this view.

Figure 7:
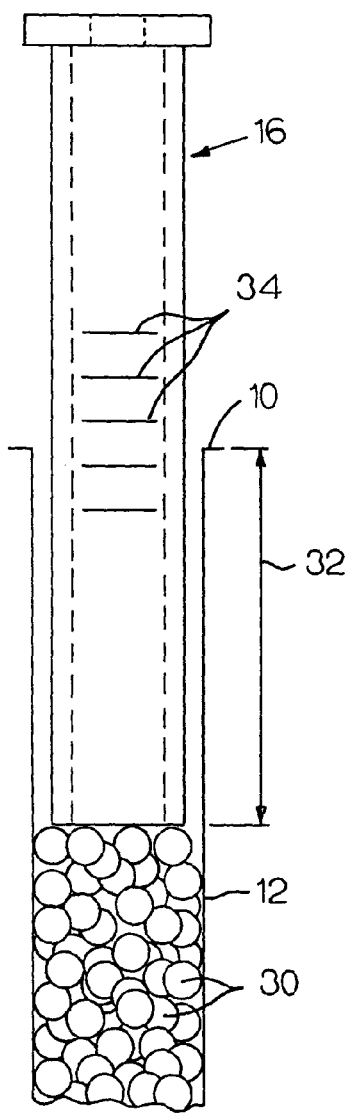
FIG. 7 is a side view of the loading sleeve of FIG. 5.

Once several of the loading sleeves 16 are filled with catalyst 30, they are then completely removed from the reactor tube 12. The loading sleeves 16 may have to be tapped in order to ensure that all of the catalyst 30 falls out of the sleeve 16 and remains in its respective reactor tube 12. Since the volume inside the loading sleeve 16 is less than the volume of the surrounding portion of the reactor tube 12, when the loading sleeve 16 is removed, the catalyst 30 that was in the loading sleeve 12 falls downwardly to fill the larger diameter reactor tube 12, leaving a gap or outage 32 from the top of the catalyst 30 to the top of the tube sheet 10, as shown in FIG. 7. The relative inside diameters of the loading sleeve and the reactor tube may be selected to achieve the desired outage 32 when the loading sleeve is removed from the reactor tube.

After the loading sleeve 16 has been removed from the reactor tube and the catalyst 30 has settled to form the outage 32, the loading sleeve 16 is again inserted into the reactor tube 12, as shown in FIG. 7. This time, the catalyst 30 prevents the loading sleeve from being inserted all the way into the reactor tube 12. Instead, the loading sleeve 16 can only be inserted the distance of the outage 32, at which point it is prevented by the catalyst 30 from being inserted any further.

There are graduated markings 34 on the sleeve 16, which are then used to determine whether the catalyst 30 has been loaded to the correct outage. The markings 34 preferably are on the outer surface of the sleeve 16. The markings may be of various types. There may be a plurality of graduated markings at various heights, as shown in FIG. 7, which may indicate the distance of the marking above the bottom of the sleeve 16, or the bottommost marking may indicate a height of "0" and the other markings indicate their height above the "0" mark, for example. Or there may be a group of markings that say "In spec" and markings above and below those that say "out of spec", or one section of the sleeve may be marked in green or another preferred color, indicating the correct outage range, and sections above and below that section may be marked in another color, such as red, to indicate that they are outside of the specified outage range. Other similar indicators may be used so that a person inserting the loading sleeve back into the reactor tube can determine the dimension of the outage 32, or whether the outage 32 is within a predetermined, specified range.

Thus, with a single tool, a worker may both install the catalyst and then check the catalyst height to be sure the gap 32 above the catalyst is within a desired range. If the gap 32 is too large, the worker may insert additional catalyst and check again. If the gap 32 is too small, the worker may vacuum out some catalyst, check again, and add catalyst as needed. By providing both the loading function and the measuring function in a single tool, the worker does not have to carry two separate tools for performing these two functions.

Figure 4:
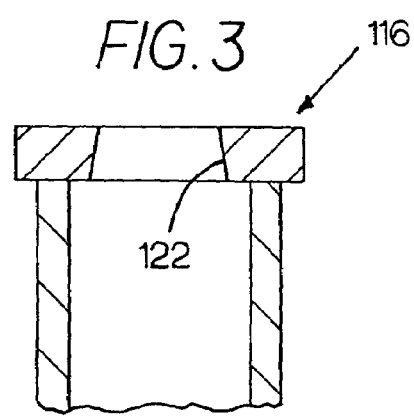
FIG. 4 is a section view through an alternative embodiment of a loading sleeve.
Figure 6:
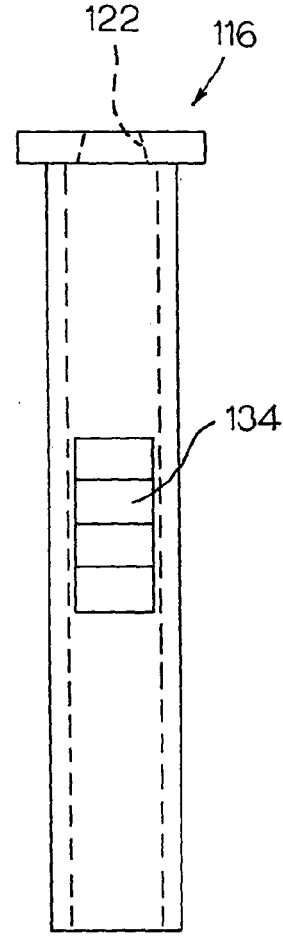
FIG. 6 is a side view of the loading sleeve of FIG. 4.

FIGS. 4 and 6 show an alternative embodiment of a loading sleeve 116. In this embodiment, the opening 122 through the upper flange is tapered, having a smaller diameter at the top and a larger diameter at the bottom. This embodiment also differs from the first embodiment in that, instead of having a plurality of graduations on the tube, this embodiment has a single wide band indicating positions of the loading sleeve 116 at which the outage 32 would be within the desired range. If the entire band 134 is below the upper tube sheet 10 and cannot be seen, then the person measuring the outage knows that the outage 32 is too large and more catalyst should be added. If the person can see the entire band 134, including its bottom edge, extending above the upper tube sheet 10, then he knows that the outage 32 is too small, and some catalyst should be removed. If only a portion of the band 134 projects above the upper tube sheet 10, the person knows that the outage 32 is within the desired specified range.

Figure 8:
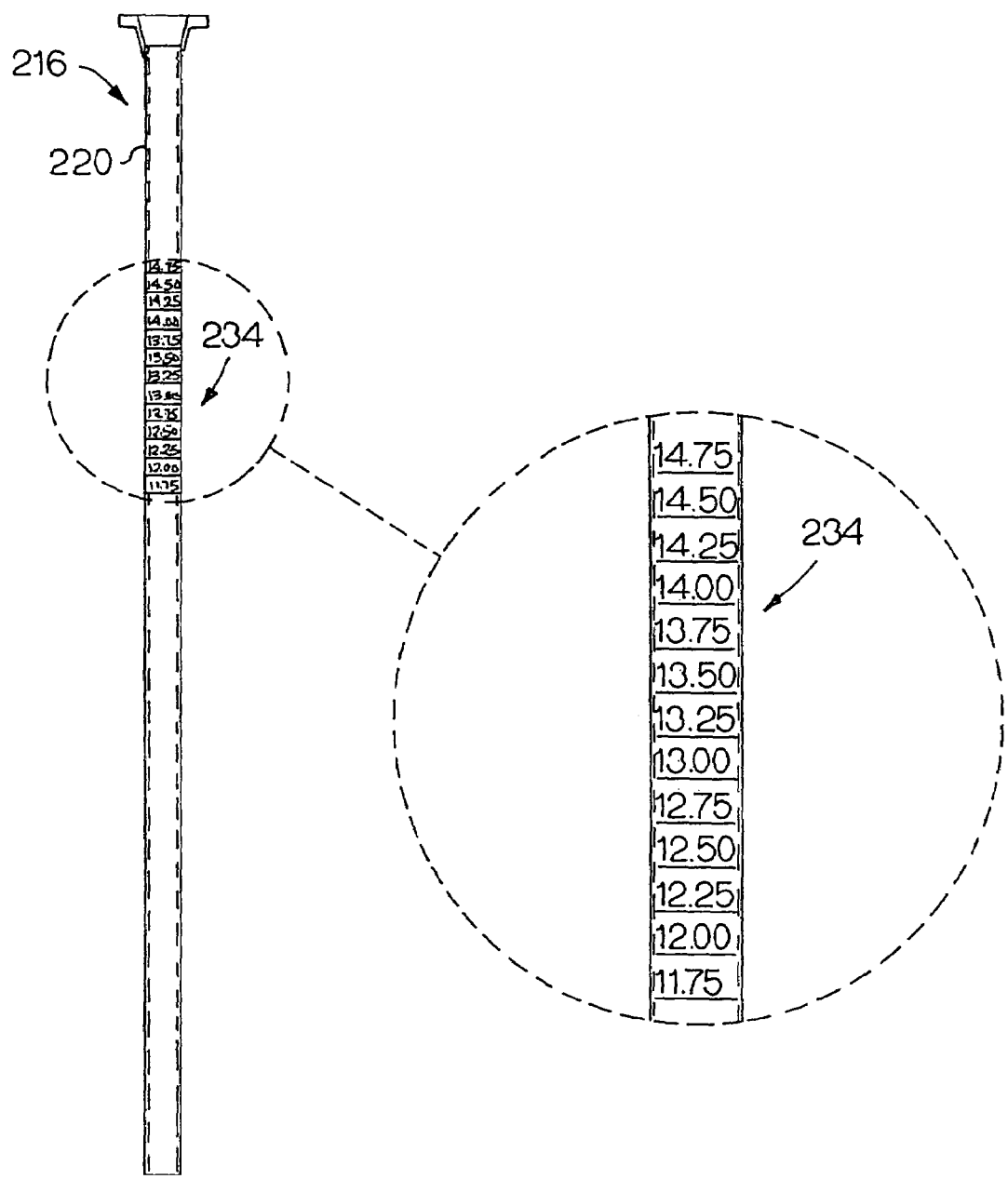
FIG. 8 is a side view of another alternative embodiment of a loading sleeve.
Figure 9:
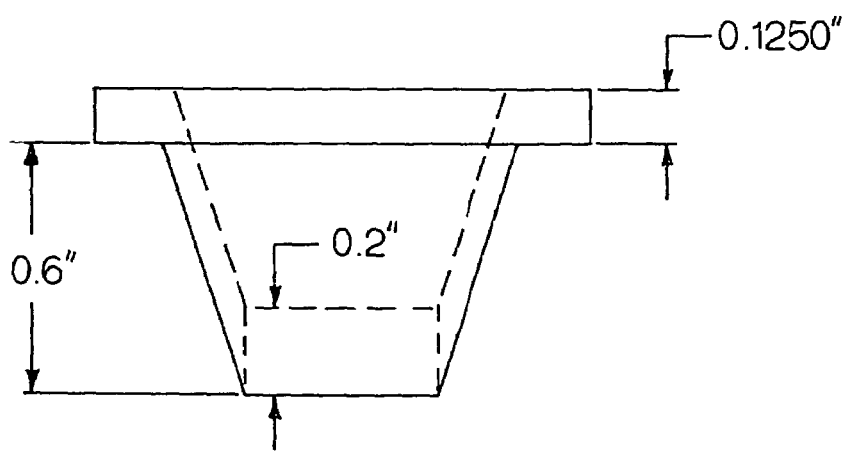
FIG. 9 is an enlarged view of the upper portion of the loading sleeve of FIG. 8.
Figure 10:
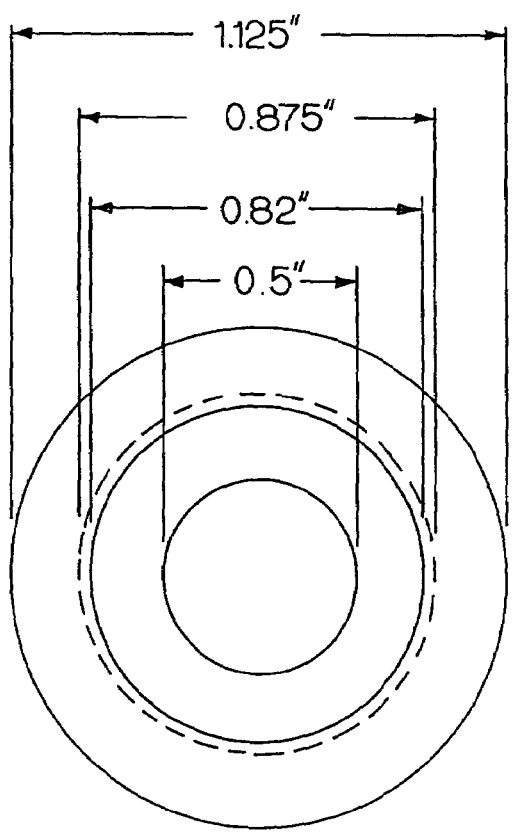
FIG. 10 is a top view of the loading sleeve of FIG. 8.

FIGS. 8-10 show a second alternative embodiment of a loading sleeve 216. In this embodiment, the downwardly projecting tubular sleeve portion 220 does not have a constant diameter. Instead, its upper portion is tapered, like a funnel, having a larger diameter at the top and tapering to a smaller diameter. Then, the rest of the tubular portion 220 has a constant diameter which is the same as the smaller diameter of the tapered portion. This loading sleeve 216 has a plurality of graduations 234, which indicate the height of the graduation above the bottom of the tubular sleeve 216. With this device, the person will obtain an actual reading of the outage dimension 32 rather than just an indication of whether it is in or out of a pre-specified range.

Figure 11:
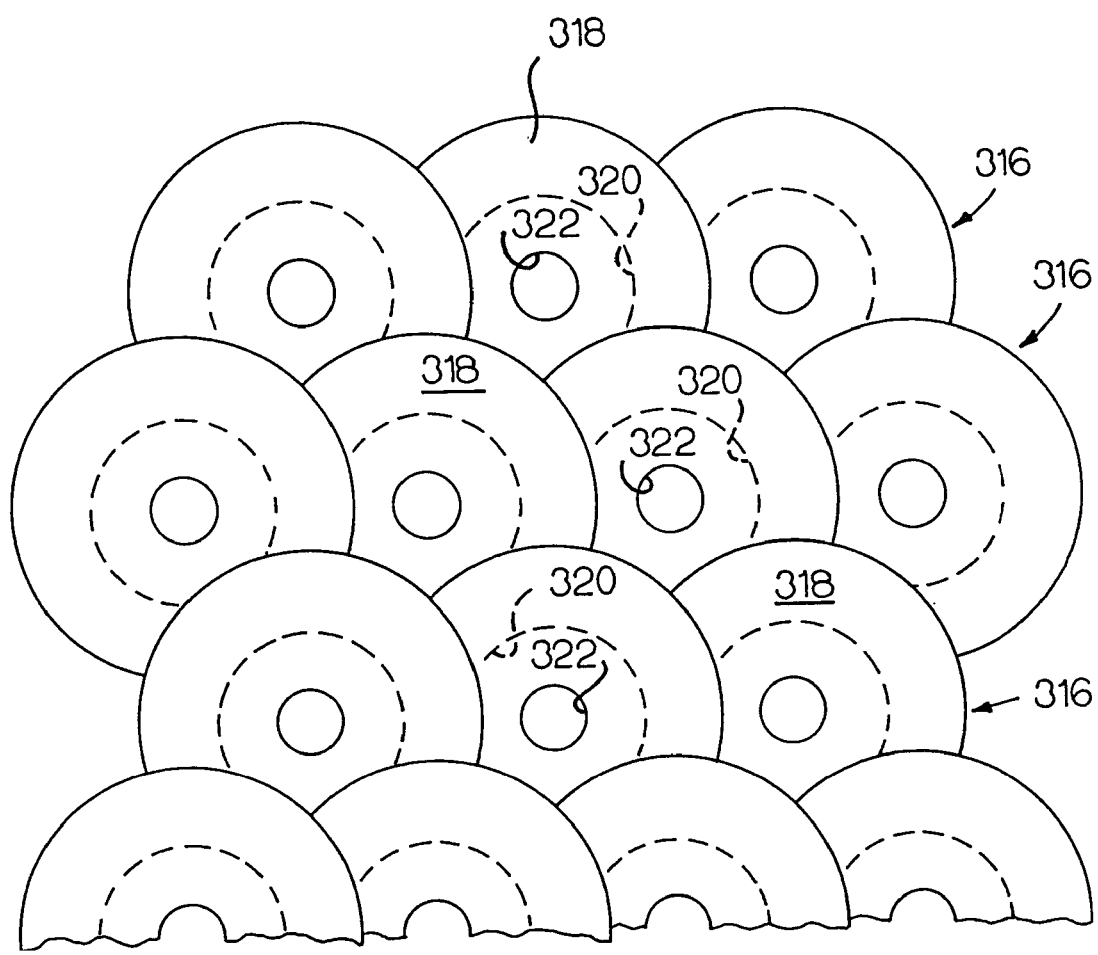
FIG. 11 is a top view of a reactor using another alternative embodiment of a loading sleeve.
Figure 12:
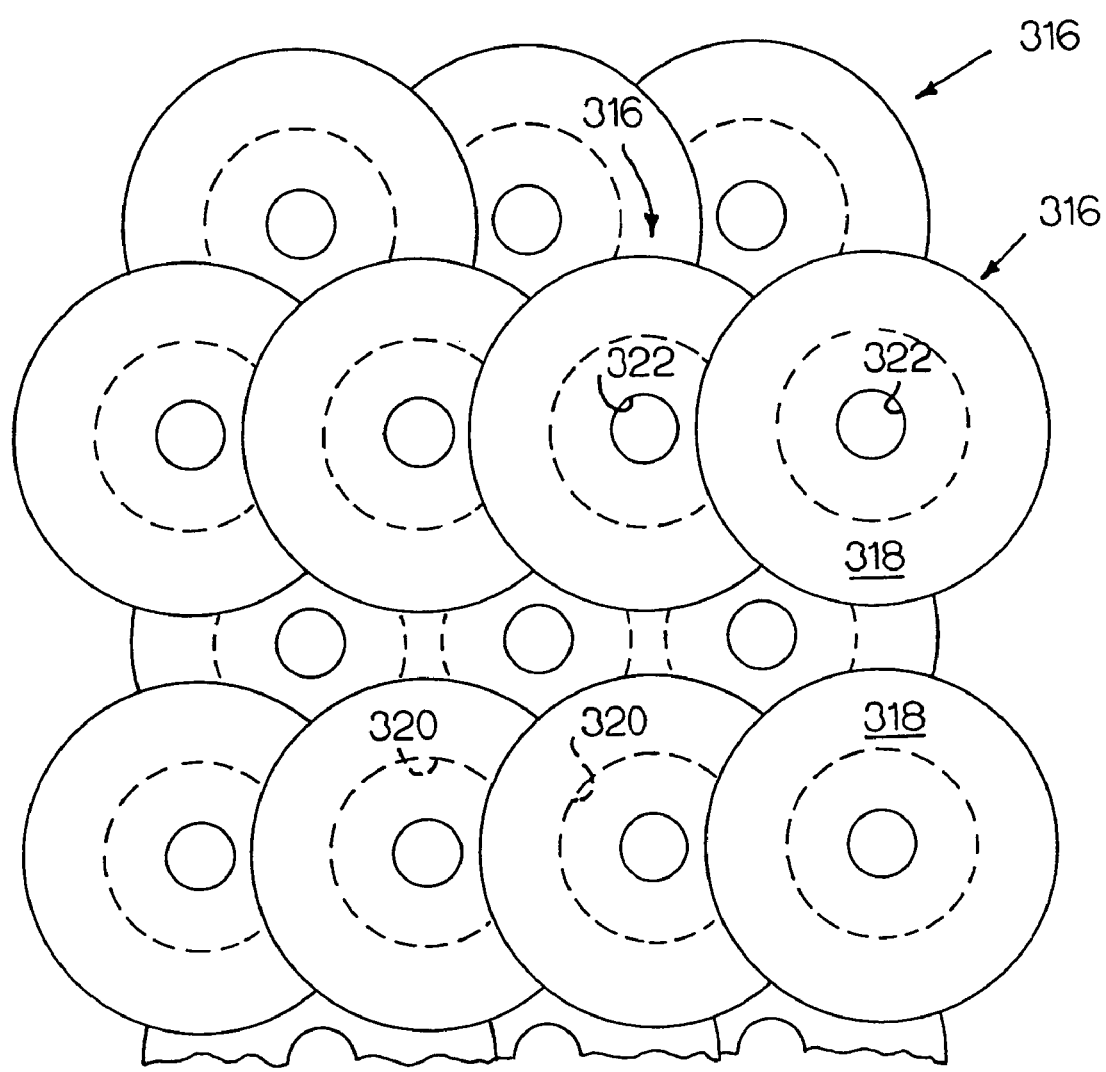
FIG. 12 is a top view of a reactor using the same loading sleeve as FIG. 11 but with the loading sleeves arranged in a different way.

FIGS. 11 and 12 show another alternative embodiment of a loading sleeve 316 made in accordance with the present invention. This loading sleeve 316 is identical to the sleeve 16 of FIGS. 1-3, except that the flange portion 318 has a larger diameter, so that the flange portions 318 of adjacent loading sleeves 316 overlap each other. The flange portions 318 have a diameter that is large enough to ensure a complete overlap of the adjacent flanges, so that none of the upper tube sheet 10 between the loading sleeves 316 is exposed, and yet small enough that the flanges 318 do not cover the adjacent openings 322.

FIG. 11 shows one arrangement of these large-flanged loading sleeves 316, in which the person begins inserting the sleeves 316 at one end of the reactor and then just overlaps subsequent rows of flanges 318 over the previous rows similar to fish scales. As with the previous embodiment, these sleeves 316 include flanges 318 and tubular portions 320. It should be noted that the sleeves 316 are made of a somewhat flexible material, such as plastic, so all the flanges 318 are close to the surface of the upper tube sheet 10.

FIG. 12 shows the same large-flanged loading sleeves 316 as in FIG. 11, except they have been inserted in a different order, with the flanges of a first set of rows (say the odd-numbered rows) down, in contact with the upper tube sheet 10 and the flanges of a second set of rows (say the even-numbered rows) resting on the flanges 318 of the first set of rows. In both the arrangement of FIG. 11 and the arrangement of FIG. 12, the flanges 318 overlap to prevent dust from settling down into positions on the upper tube sheet 10 between the loading sleeves. With these arrangements, the dust may be swept off or vacuumed off very readily.

It will be obvious to those skilled in the art that modifications may be made to the embodiments described above without departing from the scope of the present invention.

What is claimed is:

1. A device for loading a chemical reactor tube with catalyst and for checking the height of the catalyst within the reactor tube after loading, where the chemical reactor tube is one of a large number of reactor tubes extending from an upper tube sheet to a lower tube sheet, comprising:
   an upper flange portion for resting on top of the upper tube sheet, said upper flange portion having an outside diameter and defining an opening that is substantially unrestricted and suitable for receiving whole catalyst particles that are brushed across the top of the upper tube sheet when the flange is resting on top of the upper tube sheet;
   a tubular sleeve portion having a top and a bottom, wherein the top is adjoined to said upper flange portion, so that the opening of the flange opens into said tubular sleeve portion, and wherein said tubular sleeve portion projects downwardly from said upper flange portion;
   wherein the outside diameter of said tubular sleeve portion is smaller than the largest outside diameter of the upper flange portion for the entire length of the tubular sleeve portion, so that the tubular sleeve portion will extend into the reactor tube when the flange is resting on the upper tube sheet, and
   wherein the inside diameter of said tubular sleeve portion is larger than the smallest diameter of the opening in the flange for the entire length of the tubular sleeve portion, to ensure that any particles that can pass through the opening in the flange also will flow freely through the entire tubular sleeve portion; and at least one marking on said tubular sleeve portion at a height above the bottom of said tubular sleeve portion.

2. A device for loading a chemical reactor tube as recited in claim 1, and further comprising a plurality of graduated markings at various heights on said tubular member.

3. A device for loading a chemical reactor tube as recited in claim 1, and further comprising a wide band marking on said tubular sleeve portion indicating a range of desired outage dimensions.

4. A device for loading a chemical reactor tube as recited in claim 1, wherein said opening is tapered, having a smaller diameter at the top than at the bottom.

5. A device for loading a chemical reactor tube as recited in claim 1, wherein the tubular portion has a substantially constant inside diameter.

6. A device for loading a chemical reactor tube as recited in claim 5, wherein the tubular sleeve portion has a substantially constant outside diameter.

7. A device for loading a chemical reactor tube as recited in claim 6, and further comprising a chemical reactor, including an upper tube sheet and a chemical reactor tube projecting downwardly from said upper tube sheet and having an inside diameter, wherein said flange has a larger outside diameter than the inside diameter of the chemical reactor tube, and said tubular sleeve portion has a smaller outside diameter than said chemical reactor tube and is received in said chemical reactor tube with said flange located above said chemical reactor tube.

8. A device for loading a chemical reactor tube as recited in claim 7, and further comprising catalyst in said chemical reactor tube, wherein said tubular sleeve portion is resting on top of the catalyst, and said marking provides means for determining whether the level of catalyst in the tube is at the desired height.

9. A device for loading a chemical reactor tube with catalyst and for checking the height of the catalyst within the reactor tube after loading, where the chemical reactor tube is one of a large number of reactor tubes extending from an upper tube sheet to a lower tube sheet, comprising:

a loading sleeve, including an upper flange portion that is suitable for resting on top of the upper tube sheet, said upper flange portion having an outside diameter and defining an opening that is substantially unrestricted and suitable for receiving whole catalyst particles that are brushed across the top of the upper tube sheet when the flange is resting on top of the upper tube sheet;

a tubular sleeve portion projecting downwardly from said upper flange portion to a bottom end;

wherein the outside diameter of said tubular sleeve portion is smaller than the largest outside diameter of the upper flange portion for the entire length of the tubular sleeve portion, so that the tubular sleeve portion will extend into the reactor tube when the flange is resting on the upper tube sheet, and wherein the inside diameter of said tubular sleeve portion is larger than the smallest diameter of the opening in the flange for the entire length of the tubular sleeve portion, to ensure that any particles that can pass through the opening in the flange also will flow freely through the entire tubular sleeve portion;

and at least one marking on said tubular sleeve portion at a height above said bottom end.

10. A device for loading a chemical reactor tube as recited in claim 9, and further comprising a plurality of graduated markings at various heights on said tubular sleeve portion.

11. A device for loading a chemical reactor tube as recited in claim 9, and further comprising a wide band marking on said tubular sleeve portion indicating a range of desired outage dimensions.

12. A device for loading a chemical reactor tube as recited in claim 9, wherein said opening is tapered, having a smaller diameter at the top than at the bottom.

* * * * *